United States Patent
Saito et al.

(10) Patent No.: US 8,297,824 B2
(45) Date of Patent: Oct. 30, 2012

(54) LIGHT GUIDE PLATE AND DISPLAY DEVICE USING THE SAME

(75) Inventors: Toshihisa Saito, Osaka (JP); Masaru Furujiku, Osaka (JP); Tsuyoshi Ishikawa, Tokyo (JP); Eizaburo Higuchi, Tokyo (JP)

(73) Assignees: Panasonic Corporation, Osaka (JP); Nitto Jushi Kogyo Co., Ltd., Tokyo (JP)

( * ) Notice: Subject to any disclaimer, the term of this patent is extended or adjusted under 35 U.S.C. 154(b) by 333 days.

(21) Appl. No.: 12/629,246

(22) Filed: Dec. 2, 2009

(65) Prior Publication Data

US 2010/0172150 A1 Jul. 8, 2010

(30) Foreign Application Priority Data

Dec. 3, 2008 (JP) ................................ 2008-308631
Nov. 9, 2009 (JP) ................................ 2009-256136

(51) Int. Cl.
*F21V 7/04* (2006.01)

(52) U.S. Cl. ................ 362/607; 362/620; 362/626

(58) Field of Classification Search ................. 362/607, 362/619, 620, 612, 625, 626
See application file for complete search history.

(56) References Cited

U.S. PATENT DOCUMENTS

| | | | | |
|---|---|---|---|---|
| 6,454,452 | B1 * | 9/2002 | Sasagawa et al. | 362/561 |
| 6,612,729 | B1 * | 9/2003 | Hoffman | 362/551 |
| 6,698,907 | B1 * | 3/2004 | Alahautala et al. | 362/26 |
| 6,966,685 | B2 * | 11/2005 | Li et al. | 362/616 |
| 7,393,131 | B2 * | 7/2008 | Yu et al. | 362/620 |
| 7,568,928 | B2 * | 8/2009 | Hou et al. | 439/188 |
| 7,936,411 | B2 * | 5/2011 | Kim et al. | 349/56 |
| 7,967,494 | B2 * | 6/2011 | Chi et al. | 362/626 |
| 2006/0133113 | A1 * | 6/2006 | Koike et al. | 362/626 |
| 2008/0008434 | A1 * | 1/2008 | Lee et al. | 385/129 |
| 2009/0033832 | A1 * | 2/2009 | Pai | 349/65 |

FOREIGN PATENT DOCUMENTS

JP   2008 041270   2/2008

* cited by examiner

*Primary Examiner* — John A Ward
(74) *Attorney, Agent, or Firm* — Wenderoth, Lind & Ponack, L.L.P.

(57) ABSTRACT

To solve an uneven light quantity caused in a case where a light guide plate, in which light from a spot light source such as an LED enters an surface, changes by 90 degrees and exits the light to the outside, is used as a backlight. The light guide plate of the invention includes a light flux unifying region. The light flux unifying region has an incident surface, a first surface, and an exit surface. Light fluxes emitted from a light source enter the incident surface. The first surface is almost perpendicular to the incident surface and the intensity distribution of the light fluxes having entered is unified at the first surface. The exit surface is disposed almost parallel with the incident surface and the unified light fluxes exit from the exit surface. A boundary line between the incident surface and the first surface has a zigzag surface.

9 Claims, 7 Drawing Sheets

LIGHT GUIDE PLATE AND DISPLAY DEVICE USING THE SAME

BACKGROUND OF THE INVENTION

1. Field of the Invention

The present invention relates to a light guide plate used in an illuminating device, which is used as a backlight for a liquid crystal display panel, a keyboard, or the like, and more particularly to a light guide plate and a display device using the same.

2. Description of the Related Art

Backlights of display devices in portable electronic equipments or the like are arranged at an end or side surface of an illuminating body from the viewpoint of reducing the thickness and weight. In this case, surface illumination becomes possible by turning an optical axis of a light flux emitted from the light source by 90 degrees using a light guide plate.

Further, in recent years, a variety of light sources are used in illuminating devices from the viewpoint of energy conservation. Particularly, light emitting diodes (LEDs) receive attention as energy conserving light sources, and changeovers from cold cathode ray tubes to LEDs are being advanced. The LED is a spot light source with a high directivity. Therefore, in order to replace the cold cathode ray tube of a linear light source with LEDs, it is necessary to adequately unify the level of the intensity distribution of a plurality of independent light fluxes emitted from a plurality of LEDs with use of a light guide plate.

As a conventional example of such a light guide plate, for example, a light guide plate formed by using a plate of a transparent resin such as an acrylic resin, a carbonate resin or the like is proposed in Japanese Unexamined Patent Publication No. 2008-041270. In this conventional example, on the whole area of one main surface of the light guide plate, a light diffusing section of line grooves or line projections arranged into a row, and a light deflecting region for causing light diffused in the light diffusing section to exit toward the other main surface are provided. As a result of the above-mentioned constitution, in a surface-illuminating device using a plurality of LEDs, a plurality of light fluxes emitted from the LEDs are considered to be adequately diffused and mixed to therefore resolve unevenness of luminance.

However, in the conventional light guide plate, the vicinity of a surface which LED light enters is formed as a flat surface. The light entered the surface is merely reflected at a reflection angle equal to an incident angle on the flat surface, and is not diffused in a direction orthogonal to an optical axis. As a result, unifying the level of a plurality of light fluxes is insufficient. Furthermore, there was a problem that brightness of a display device is reduced since it is impossible to direct the light fluxes to an illuminating surface with efficiency.

In addition, in the conventional light guide plate, the light diffusing section and the light deflecting region coexist. Therefore, the light fluxes are deflected in the light deflecting region in a state of insufficient equalization. Accordingly, unevenness of light quantity (also referred to as a firefly phenomenon) due to condensing of spots of light from a plurality of LEDs arranged in a row is generated particularly in the vicinity of the LEDs of the display device.

Furthermore, the firefly phenomenon significantly appears by a constitution in which a distance between the LED and the light guide plate is shortened or a constitution in which a light-illuminating intensity of the LED is enhanced. Accordingly, in order to remove the firefly phenomenon, it was necessary to weaken the illuminating intensity of the LED and lengthen the distance between the LED and the light guide plate. As a result, there were problems that the light-illuminating intensity of a backlight cannot be enhanced and that an effective display area in the display device is reduced.

SUMMARY OF THE INVENTION

The present invention was made to solve the above-mentioned problems, and it is a principal object of the present invention to provide a light guide plate capable of suppressing a firefly phenomenon and achieving a high brightness, and a display device using the light guide plate.

In order to achieve the above object, the present invention provides a tabular light guide plate which receives incident light from a side, unifies the levels of the received incident light, and emits uniform light from a plane of the plate, the light guide plate comprising: an incident surface formed on one side of the light guide plate for receiving the incident light; a light emitting plane formed on one plane of the light guide plate for emitting the uniform light; a light deflecting region formed at a portion of the light guide plate correspondingly to the light emitting plane; and a light flux unifying region formed at a portion of the light guide plate between the incident surface and the light deflecting region, said light flux unifying region having one plane thereof formed with a plurality of parallel grooves to form a zigzag surface, said grooves extending vertically from the incident surface.

Further, the present invention provides a display device including a plurality of light sources arranged in a row, the above-mentioned light guide plate, a prism sheet provided on the light emitting plane of the light guide plate, for directing fluxes of light emitted from the light emitting plane to a direction approximately perpendicular to the light emitting plane, and a reflecting plate provided on a plane opposite to the light emitting plane of the light guide plate.

In accordance with the light guide plate of the present invention, the light flux unifying region is separated from the light deflecting region and a region inclined to a direction of arrangement of the light sources is significantly increased in the first surface. Thereby, the light fluxes are dispersed and mixed by the reflection and refraction of the light fluxes at the inclined surface and therefore the intensity distribution of the light fluxes are adequately unified. Thereafter, the unified light fluxes are deflected, and therefore it becomes possible to adequately suppress the firefly phenomenon. Further, as a result of disappearance of the firefly phenomenon, it becomes possible to widen an effective display area of the display device using the light guide plate of the present invention. Furthermore, since the first surface is composed of a combination of the flat inclined surfaces, scattering of the light fluxes is low and the consumption of the light fluxes due to scattering loss becomes small, and therefore the display device of the present invention can achieve high brightness.

DETAILED DESCRIPTION OF THE PREFERRED EMBODIMENT

Hereinafter, some examples of the best mode for embodying the present invention will be described in reference to drawings. In the drawings, like components are denoted by like reference numbers. Further, when a lead line to the reference number is a dotted line, the part indicated by the reference number is a hidden part.

(First Embodiment)

Figure 1:
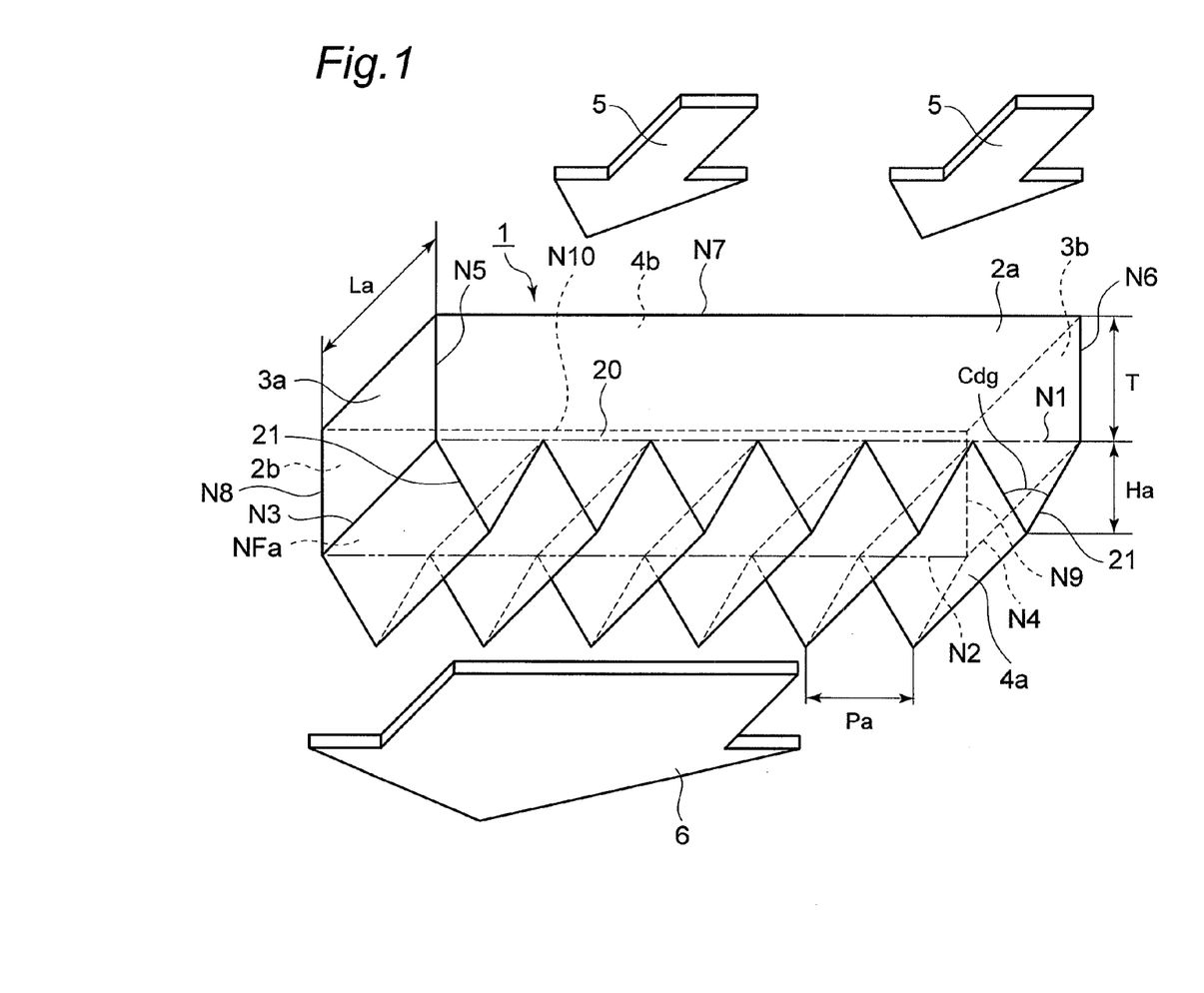
FIG. 1 is a perspective view of a light flux unifying region of a light guide plate in a first embodiment of the present invention.

FIG. 1 is a perspective view of a light flux unifying region 1 in a light guide plate of a first embodiment. The light guide plate of the first embodiment has a tabular shape, and has an incident surface which receives incident light and a light emitting plane which unifies the incident light and emits uniform light. The light flux unifying region 1 is provided between the incident surface and the light emitting region. Only the light flux unifying region 1 is shown in FIG. 1. A plurality of parallel grooves, providing a zigzag surface, are formed on one plane of the light flux unifying region 1. This plane is preferably a plane opposite to the light emitting plane. Similar grooves may be provided on the other plane, if necessary. The grooves extend from the incident surface and the direction in which the grooves extend is along an optical axis of the incident light. Therefore, the direction of the grooves is almost perpendicular to the incident surface. The shape of the grooves, when viewed from the incident surface, can be a saw tooth-shape or can be a curved wave-shape (sine wave-shape, for example). Since the saw tooth-shape is preferable, hereinafter, the grooves with the saw tooth-shape will be described in general.

The light flux unifying region 1 has an incident surface 2a, an exit surface 2b, a light flux unifying surface 4a, a surface 4b, a side 3a and a side 3b. The light flux unifying surface 4a is disposed in the vicinity of a virtual plane NFa, and has a cross section perpendicular to an optical axis in a shape of a broken line as shown in FIG. 1. The cross section may be a curved line instead of the broken line. The virtual plane NFa is disposed perpendicular to the incident surface 2a, the exit surface 2b, the side 3a and the side 3b, respectively, across boundary lines N1, N2, N3 and N4, and is disposed parallel with the surface 4b. The incident surface 2a is disposed perpendicular to the side 3a, the side 3b and the surface 4b, respectively, across boundary lines N5, N6 and N7, and is disposed parallel with the exit surface 2b. The exit surface 2b is disposed perpendicular to the side 3a, the side 3b and the surface 4b, respectively, across boundary lines N8, N9 and N10.

The respective faces 2a, 2b, NFa, 4b, 3a and 3b are flat planes in the first embodiment, but they may be curved faces. The respective boundary lines N1 to N10 are straight lines in the first embodiment, but they may be curved lines. Angles which the respective faces 2a, 2b, NFa, 4b, 3a and 3b form with one another are right angles or 0 degrees (parallel), but other angles may be formed.

In the first embodiment, a light emitting diode (LED) as a spot light source is used for a light source. A plurality of LEDs is arranged parallel with the boundary lines N1 and N7. Furthermore, each of the plurality of LEDs is arranged in such a way that an optical axis is perpendicular to the incident surface 2a and the exit surface 2b, that is, the optical axis is parallel with the boundary lines N3 and N4.

Light fluxes 5 respectively emitted from the LEDs enter the incident surface 2a. The intensity distribution of the plurality of incident light fluxes 5 from the plurality of LEDs has a plurality of peaks. On the light flux unifying surface 4a, the plurality of light fluxes 5 thus having entered are mixed by dispersing the light fluxes to have a flat intensity distribution with no peaks. Therefore, the plurality of light fluxes 5 is unified into one light flux 6. The unified light flux 6 exits from the exit surface 2b.

A boundary line 21 between the light flux unifying surface 4a and the incident surface 2a is saw tooth-shaped as shown in FIG. 1.

Figure 6:
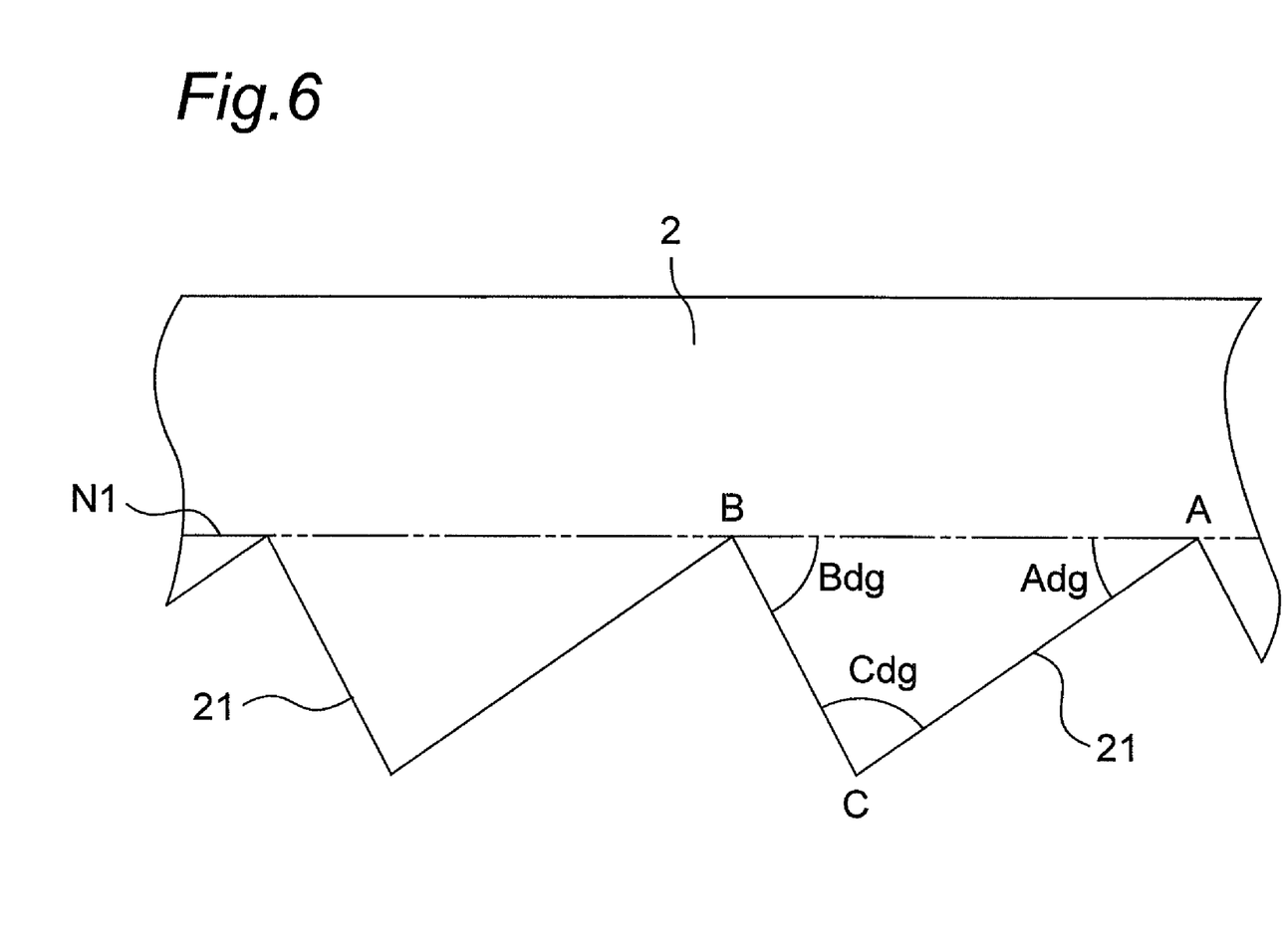
FIG. 6 is a schematic view showing a saw tooth shape of the light flux unifying region of the light guide plate in the first embodiment of the present invention.

FIG. 6 is a schematic view showing the saw tooth shape in the light guide plate of the first embodiment. As shown in FIG. 6, a triangle ABC, in which points A, B and C are apexes thereof, respectively, shares a side AB with the boundary line N1 in common. A side AC is inclined at an angle of an inner angle Adg of the apex A to the boundary line N1, and a side BC is inclined at an angle of an inner angle Bdg of the apex B to the boundary line N1. The side AC forms an inner angle Cdg of the apex C with the side BC. The inner angle Adg and the inner angle Bdg are acute angles. In the first embodiment, the inner angle Cdg is also an acute angle and the triangle ABC is thus an acute triangle. Alternatively, the inner angle Cdg maybe a right angle and thus the triangle ABC may be a right triangle, or the inner angle Cdg may be an obtuse angle and thus the triangle ABC may be an obtuse triangle. The boundary line 21 forms a shape of saw teeth in which a combination of two kinds of the sides AC and BC appearing repeatedly in this manner.

With respect to the saw tooth-shaped boundary line 21, the triangle ABC may repeatedly appear adjacently, or may repeatedly appear at predetermined intervals. In the latter case, the predetermined intervals appear intermittently along the boundary line N1. The sum of these intervals is preferably half or less of the whole length of the boundary line N1. Thus, the boundary line N1 forms a zigzag surface. Furthermore, each of the inner angle Adg and the inner angle Bdg is preferably a predetermined inclination angle or more. The predetermined inclination angle is, for example, 20 degrees.

The shape of the saw tooth of the boundary line 21 can also be observed at an arbitrary cross section parallel with the incident surface 2a. More specifically, the light flux unifying surface 4a is formed by extending the boundary line 21, and such a face is formed by alternately disposing two kinds of rectangles repeatedly. One kind of the rectangle forms one inclined surface of a triangle prism lying over the virtual plane NFa, and the other kind of the rectangle forms another inclined surface of the triangle prism lying over the virtual plane NFa. These two kinds of rectangles are inclined at angles Adg and Bdg, respectively, to the virtual plane NFa. The light flux unifying surface 4a at an arbitrary cross section parallel with the incident surface 2a may vary from the shape of the boundary line 21 while maintaining a similar shape as moving away from the incident surface 2a.

The plurality of light fluxes 5 from the plurality of LEDs are dispersed and mixed by reflecting and refracting at the plurality of inclined surfaces of the triangular prisms, and are unified into the single light flux 6.

Forming a blaze based on the acute triangle as described above is more preferable than forming a blaze based on a right triangle in which the inclination angle Adg or the inclination angle Bdg is a right angle like a diffraction grating. The reason therefor is that the plurality of light fluxes 5 having entered the incident surface 2a respectively has an intensity distribution (light distribution) approximately symmetric with respect to the optical axis in a plane parallel with the virtual plane NFa. In the light flux unifying surface 4a, two kinds of light fluxes in directions symmetric with respect to the optical axis can be respectively dispersed with efficiency by use of the two kinds of rectangles described above. In this sense, it is further preferable that the acute triangle ABC is an isosceles triangle with the side AB being a base and the inclination angle Adg and the inclination angle Bdg being equal to each other.

The light flux unifying surface 4a can be shaped, for example, in the following manner. A metal plating layer is formed on a metal, and the plated metal is machined so that the side of a molded article corresponding to the plated portion has the shape of the light flux unifying surface 4a to prepare a die. By injecting the material of the light flux unifying region 1 such as an acrylic resin or a polycarbonate resin, into such a die and molding, a light flux unifying region 1 having a light flux unifying surface 4a can be fabricated. The light flux unifying surface 4a can also be shaped by an etching method instead of the injection molding.

In FIGS. 1 and 6, the triangle ABC has the shape of so-called blaze type, in which the boundary line N1 is protruded outside the light flux unifying region 1. Alternatively, the triangle ABC may have a shape, in which the boundary line N1 is recessed inside the light flux unifying region 1. However, from the viewpoint of fabricating the light flux unifying region 1 and a light deflecting region 7 (refer to FIG. 2) to be described later integrally as one piece in the light guide plate 8, it is preferable to manufacture the die by machining from the virtual plane NFa in the same plane as a light deflecting surface 4c (refer to FIG. 2) in the light deflecting region 7, and therefore it is preferable to form the shape of a blaze type.

Dimensions of the light flux unifying region 1 correlate with a degree of unifying of the light fluxes 5 having entered. These dimensions include a length La of the light flux unifying region 1, heights (i.e., thickness of the light deflecting region 7 shown in FIG. 2) T of the respective sides 3a, 3b, a height (i.e., height of the triangle ABC or blaze height) Ha of the light flux unifying surface 4a, and a pitch Pa of the light flux unifying surface 4a. The thickness of the light flux unifying region 1 refers to a distance between the surface 4b and an apex of the saw tooth. The thickness of the light flux unifying region 1 is larger than the thickness of the light deflecting region 7.

When the length La is large, the effect of unifying can be enhanced since the number of the reflections and refractions of the light fluxes 5 having entered increases. However, when the length La is increased to a certain level or more, an effect of unifying becomes sufficient and an effective display area S in a liquid crystal display panel 16 to be described later with reference to FIG. 4 becomes narrow.

When the heights T of the sides 3a and 3b and the height Ha of the light flux unifying surface 4a are small, the effect of unifying can be enhanced since the number of the reflections and refractions increases. However, since the heights T are also associated with a height Sh of a row 11 of the LEDs to be described later with reference to FIG. 3, a preferable range of the height T exists. Further, when the height Ha is reduced to a certain level or less, the number of the reflections and refractions decreases since areas of the two kinds of inclined rectangles described above become small. Furthermore, since the inclination angles Adg and Bdg are also reduced, components in an arrangement direction of the reflections and refractions of the light fluxes are reduced, and therefore the effect of dispersing and mixing the light fluxes in the arrangement direction is reduced.

When the pitch Pa of the light flux unifying surface 4a is small, the effect of unifying can be enhanced since the number of the reflections and refractions increases. However, if the protrusion angle Cdg remains constant, the number of the reflections and refractions decreases since the areas of the two kinds of inclined rectangles described above become small.

For the reasons described above, the length La of the light flux unifying region 1 is preferably at least the heights T of the respective sides 3a and 3b in the light flux unifying region 1 and 6×T or less. The heights T of the sides 3a and 3b are preferably 0.8×Sh or more and 1.2×Sh or less with respect to the height Sh of the row 11 of LEDs to be described later. The blaze height Ha (also referred to as a depth Ha of the groove) is desirably 0.0025×T or more and 0.025×T or less. The height Ha is in a range of 1 to 20 µm, and preferably in a range of 5 to 10 µm. The pitch Pa of the light flux unifying surface 4a is 50 µm or less, and preferably 30 µm. The protrusion angle Cdg is 60 degrees or more and 150 degrees or less, preferably 70 degrees or more and 110 degrees or less, more preferably 80 degrees or more and 100 degrees or less, and the most preferably about 90 degrees. In the first embodiment, La is 4 mm, T is 1 mm, Ha is 8 µm, Pa is 16 µm, and Cdg is 90 degrees.

Figure 2:
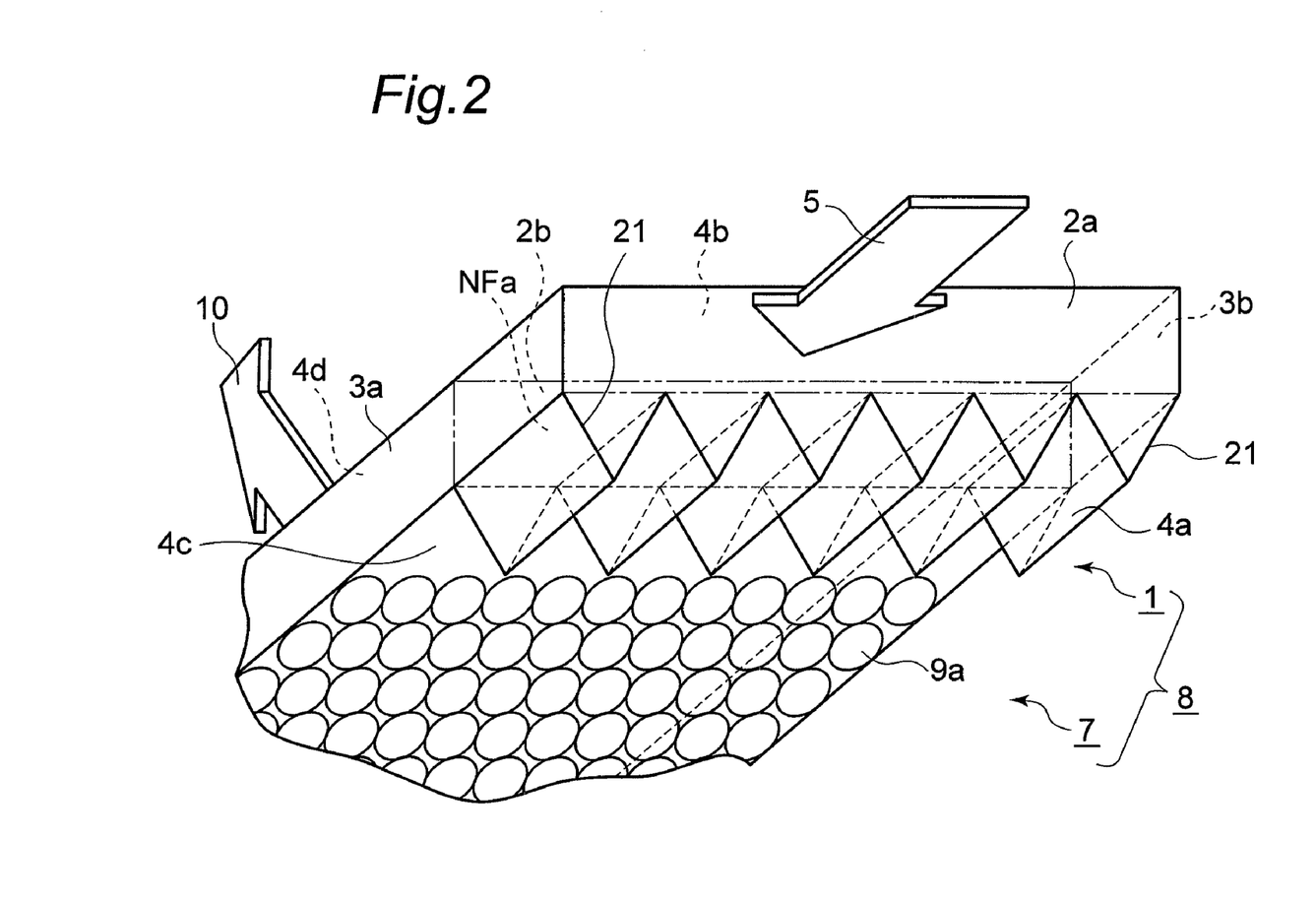
FIG. 2 is a perspective view of the light guide plate in the first embodiment of the present invention.

FIG. 2 is a perspective view of the light guide plate 8 in the first embodiment. The light guide plate 8 in the first embodiment further includes the light deflecting region 7 adjacent to the light flux unifying region 1. The light deflecting region 7 has an exit surface 2b, a light deflecting surface 4c, a surface 4d, a side 3a and a side 3b. The light deflecting surface 4c is disposed in the same plane as the virtual plane NFa, and is disposed perpendicular to the exit surface 2b, the side 3a and the side 3b and parallel with the surface 4d. The surface 4d is disposed in the same plane as the surface 4b and opposed to the light deflecting surface 4c.

The respective surfaces 4c and 4d are flat planes in the first embodiment, but may be curved faces. Angles which the respective faces 2b, 4c, 4d, 3a and 3b form with one another are right angle or 0 degrees (parallel), but other angles maybe formed. The surface of the light deflecting region 7 is composed of the whole exit surface 2b, but may be composed of a part of the exit surface 2b. Though the light deflecting surface 4c is disposed in the same plane as the virtual plane NFa and the surface 4d is disposed in the same plane as the surface 4b, a difference in level may be provided between the light deflecting surface 4c and the virtual plane NFa and between the surface 4d and the surface 4b.

The light deflecting region 7 has a light deflecting element 9a to deflect the light flux in the vicinity of the light deflecting surface 4c. The light deflecting element 9a deflects the unified light flux 6 at a predetermined deflection angle relative to an optical axis direction (i.e., a direction parallel with the boundary lines N3 and N4) and the deflected light flux exits toward the surface 4d as an illuminating light flux 10.

The light deflecting element 9a is, for example, in a shape of a hollow triangular pyramid, and a triangle of a bottom surface of the triangular pyramid is in the light deflecting surface 4c (the bottom surface is schematically denoted by an ellipse in FIG. 2). The light deflecting element 9a may be in a shape of a hollow triangular prism instead of the hollow triangular pyramid. The above-mentioned predetermined deflection angle is about 150 to 170 degrees taking the optical axis direction as 0 degrees. By optimizing the shape of the light deflecting element 9a and the arrangement of the light deflecting element 9a in the light deflecting surface 4c to make the deflection angle equal to 90 degrees, a prism sheet 15 (refer to FIG. 4) to be described later may not be provided.

Figure 3:
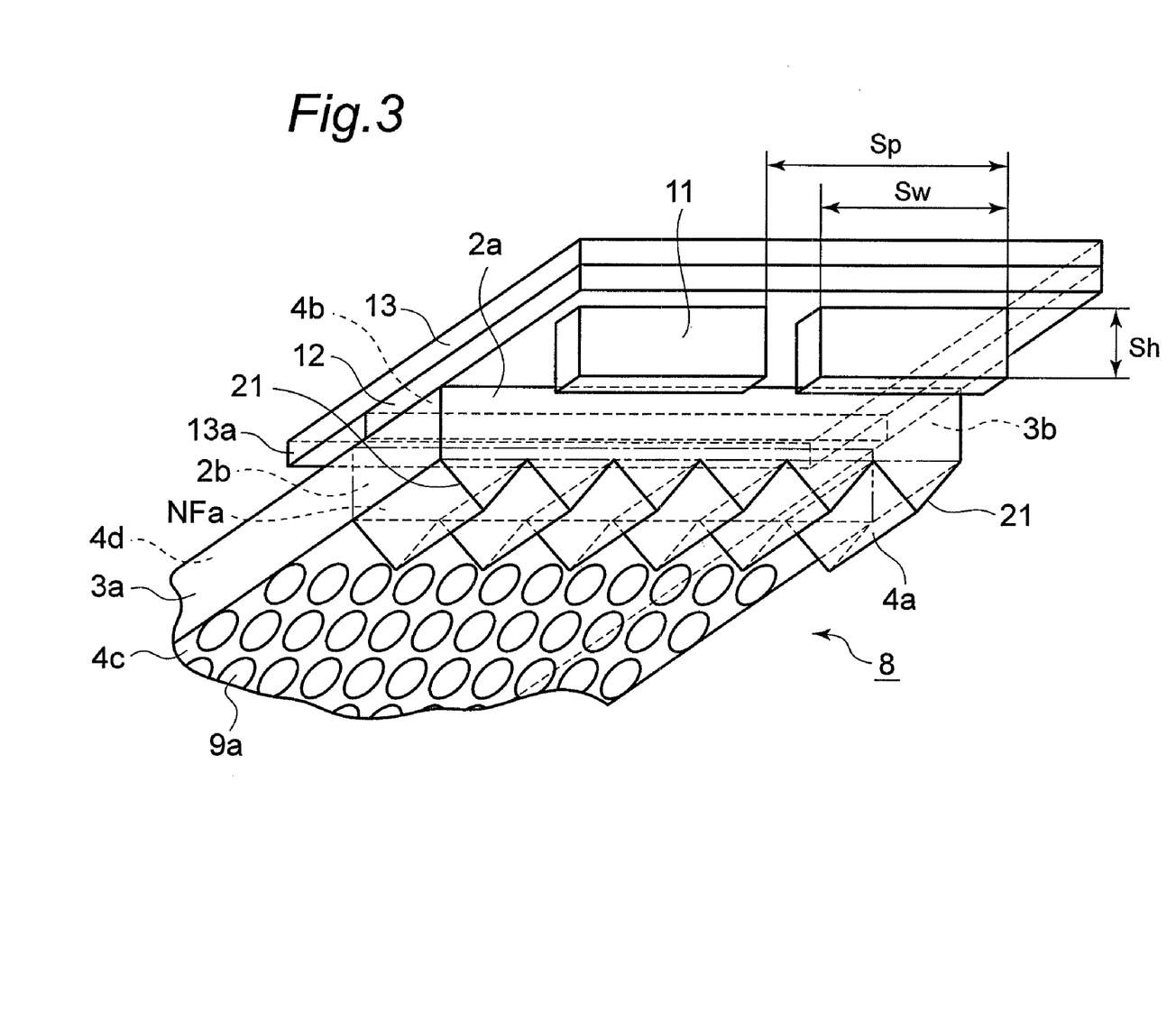
FIG. 3 is a perspective view of an illuminating device in the first embodiment of the present invention.

FIG. 3 is a perspective view of an illuminating device of the first embodiment. For ease of viewing the drawings, the arrangement of the circuit board 12 for the row 11 of the LEDs in FIG. 3 is opposite to that of the circuit board 12 in FIG. 4 described later. The illuminating device of the first embodiment includes the light guide plate 8, the row 11 of the LEDs, the circuit board 12 and a housing 13. The row 11 of the LEDs includes a plurality (for example, about 60 pieces) of LEDs, and the plurality of LEDs is arranged in a line respectively along the boundary lines N1 and N7. The circuit board 12 has wires (not shown) for supplying a current to the row 11 of the LEDs. The housing 13 secures the circuit board 12. Furthermore, the housing 13 includes a light shielding section 13a disposed nearly parallel with the surface 4b outside the surface 4b. The light shielding section 13a shields the light fluxes exiting from the surface 4b by absorbing or reflecting the light fluxes. The light shielding section 13a may be inclined to the surface 4b to a certain degree. The light shielding section 13a may shield the light fluxes exiting from the row 11 of the LEDs, or may shield the light fluxes exiting from a plane close to the surface 4b in the surface 4d.

In the first embodiment, a width Sw of each of the LEDs was 2.8 mm, a pitch Sp of the row 11 of the LEDs was 3.57 mm, and a height Sh of the row 11 of the LEDs was 1 mm same as the height T of the sides 3a and 3b. In this case, the pitch Sp of the row 11 of the LEDs is more than 200 times larger than the pitch Pa of 16 μm of the light flux unifying surface 4a described above. In such an illuminating device, the exiting light fluxes 10 were observed, but it could be confirmed that the firefly phenomenon was completely eliminated. This results from the fact that the plurality of light fluxes was adequately unified in the light flux unifying region 1.

Figure 4:
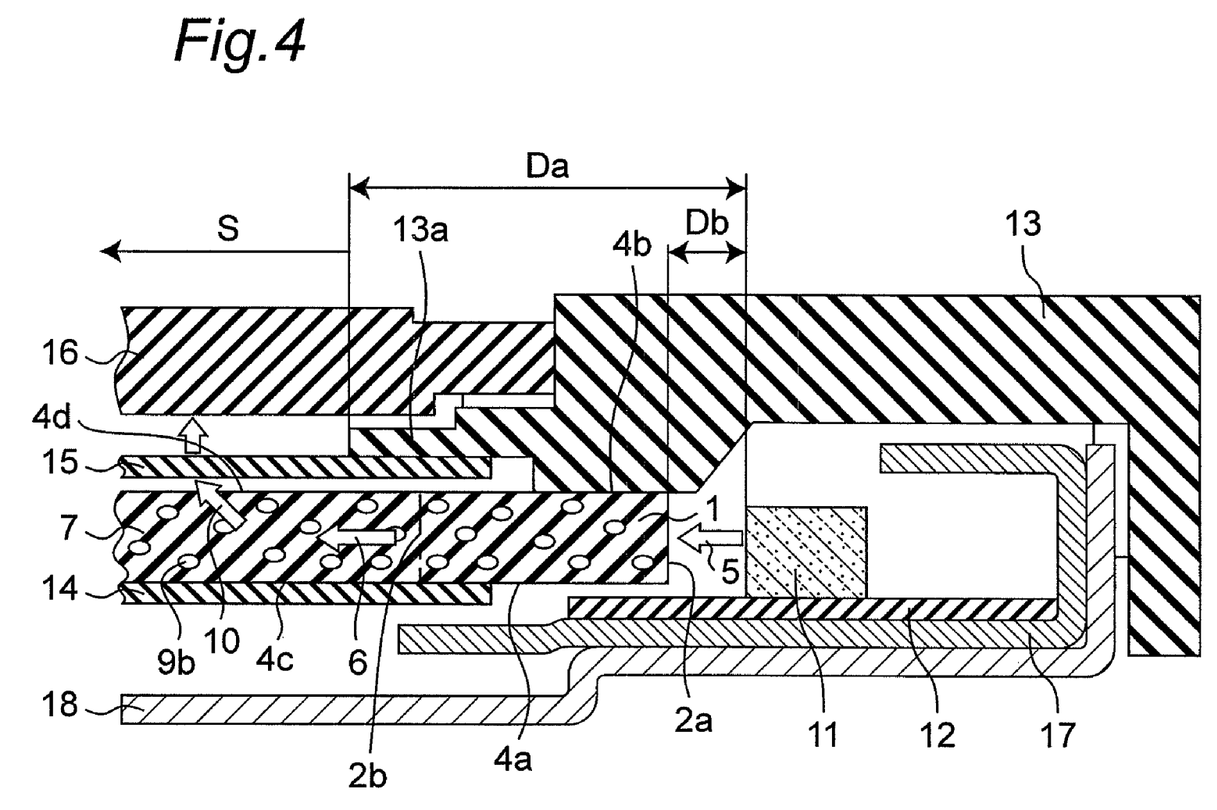
FIG. 4 is a cross sectional view of a display device in the first embodiment of the present invention.

FIG. 4 is a cross sectional view in a display device of the first embodiment. The display device of the first embodiment includes the light guide plate 8, the row 11 of the LEDs, the circuit board 12, the housing 13, a reflecting plate 14, the prism sheet 15, a liquid crystal display panel 16, a substrate fixing frame 17 and a radiating plate 18. The housing 13 supports the display device. Furthermore, as described above, the housing 13 includes the light shielding section 13a arranged nearly parallel with the surface 4b between the surface 4b and the liquid crystal display panel 16. The reflecting plate 14 is arranged independently from the light flux unifying region 1 and the light deflecting region 7 region 7, and is disposed parallel with the light deflecting surface 4c outside the light deflecting surface 4c. The reflecting plate 14 can enhance efficiency of illumination to the liquid crystal display panel 16 in the light deflecting region 7 by reflecting the light fluxes exited to return the same to the light deflecting region 7. The prism sheet 15 modifies the deflection angle of the light fluxes 10 exiting from the light deflecting region 7 to 90 degrees relative to the liquid crystal display panel 16. The liquid crystal display panel 16 is an example of an optical switch section. The substrate fixing frame 17 secures the circuit board 12. The radiating plate 18 radiates heat of the row 11 of the LEDs. The circuit board 12 may be placed on the side of the liquid crystal display panel 16 as shown in FIG. 3.

The light deflecting region 7 may have a light deflecting element 9b to deflect the light flux. The light deflecting element 9b deflects the unified light flux 6 by reflecting and refracting the light flux and the deflected light flux exits toward the surface 4d. The light deflecting element 9b is also referred to as beads. Also in the light flux unifying region 1, the light deflecting element 9b may be provided. A diameter of the bead is 1 to 20 μm, and preferably 5 to 7 μm. The amount of the beads to be added is, for example, 0.01% by weight.

In FIG. 4, the row 11 of the LEDs emits the plurality of light fluxes 5. In the light flux unifying region 1, the plurality of light fluxes 5 enters the incident surface 2a and the intensity distribution of the plurality of light fluxes 5 having entered is unified. In the light deflecting region 7, the unified light flux 6 is deflected at a predetermined deflection angle relative to the optical axis direction and the deflected light flux exits toward the surface 4d. The prism sheet 15 modifies the deflection angle of the light fluxes 10 exiting from the light deflecting region 7 to 90 degrees relative to the liquid crystal display panel 16. The liquid crystal display panel 16 transmits/shields the modified light flux by an optical switch in each pixel in a screen based on input image signals and displays an image. Furthermore, the light shielding section 13a shields the light fluxes exiting from the light guide plate 8 by absorbing or reflecting the light fluxes.

When a distance Db between the row 11 of the LEDs and the incident surface 2a is small, the intensity of light illumination to the liquid crystal display panel 16 can be enhanced. However, if the distance Db is reduced to a certain level or less, a thermal deformation of the incident surface 2a is generated resulting from illumination of the row 11 of the LEDs. When a distance Da between the row 11 of the LEDs and the surface on the side of the liquid crystal display panel 16 of the light shielding section 13a is small, the effect of shielding the light fluxes is reduced, and when the distance Da is large, the effective display area S in the liquid crystal display panel 16 becomes narrow.

For the reason described above, the effect of suppressing the firefly phenomenon can be enhanced as the distance Db between the row 11 of the LEDs and the incident surface 2a increases, but it leads to reduction in the intensity of light illumination to the liquid crystal display panel 16. Therefore, the distance Db preferably comes close to a limit at which the thermal deformation is generated to the incident surface 2a, and the distance Db is preferably 0.3 mm or more. The distance Da between the row 11 of the LEDs and the surface on the side of the liquid crystal display panel 16 of a light shielding section 13a is not particularly specified since it is determined according to the size of the display device, but it is preferably 4.3 mm or more. In the first embodiment, Db was 0.5 mm and Da was 4.5 mm.

The light flux unifying region 1 is arranged in a predetermined zone immediately close to the row 11 of the LEDs. The light flux unifying region 1 is positioned between a close plane located at the distance Db from the row 11 of the LEDs and a remote plane located at a distance of the sum of the distance Db and the length La of the light flux unifying region 1 from the row 11 of the LEDs. Therefore, a close plane located at a preferable minimum value 0.3 mm of the distance Db and a remote plane located at a preferable maximum value (for example, 1.0+6.0 mm) of the sum of the distance Db and the length La of the light flux unifying region 1 are both ends of the predetermined zone.

The light guide plate 8 having the above-mentioned dimensions and the display device using the light guide plate 8 were fabricated, and consequently, it was found that the occurrence of the firefly phenomenon was adequately suppressed, and the brightness of the liquid crystal display panel 16 was as high enough as 1300 nit. On the other hand, using a light guide plate in which a light diffusing section in the shape of a line groove or a line projection, formed into a row, and a light deflecting region were formed to coexist, a display device, in which constitutions other than the light guide plate are similar to those in FIG. 4, was manufactured. In this display device, the firefly phenomena lined up in a direction perpendicular to the cross section of FIG. 4 were clearly visible at a portion within the effective display area S, which was about 0.5 mm away from the surface of the light shielding section 13a, and the brightness of the liquid crystal display panel 16 was as insufficient as 200 nit.

Thus, the light guide plate 8 of the first embodiment is shaped such that the light flux unifying region 1 is separated from the light deflecting region 7 and the whole light flux unifying surface 4a of the light flux unifying region 1 is inclined to the direction of arrangement of the row 11 of the LEDs. Thereby, in the light flux unifying region 1, the light fluxes are dispersed and mixed by the reflection and refraction of the light fluxes at the inclined surface and therefore the intensity distribution of the light fluxes are adequately unified. Thereafter, the unified light flux is deflected in the light deflecting region 7. Therefore, it becomes possible to adequately suppress the firefly phenomenon resulting from inadequate unifying. Further, as a result of disappearance of the firefly phenomenon, it becomes possible to widen the effective display area S in the liquid crystal display panel 16. Furthermore, since the light flux unifying surface 4a is composed of the combination of flat inclined surfaces, scattering of the light flux is low and the consumption of the light flux due to scattering loss becomes small. Therefore, the amount of the light fluxes, which contribute to the liquid crystal display panel 16, increases and the liquid crystal display panel 16 can achieve high brightness.

(Second Embodiment)

In the second embodiment, points differing from the first embodiment are principally described. Since other constitutions, actions and effects except these points are similar to those of the first embodiment, descriptions thereof will not be repeated.

Figure 5:
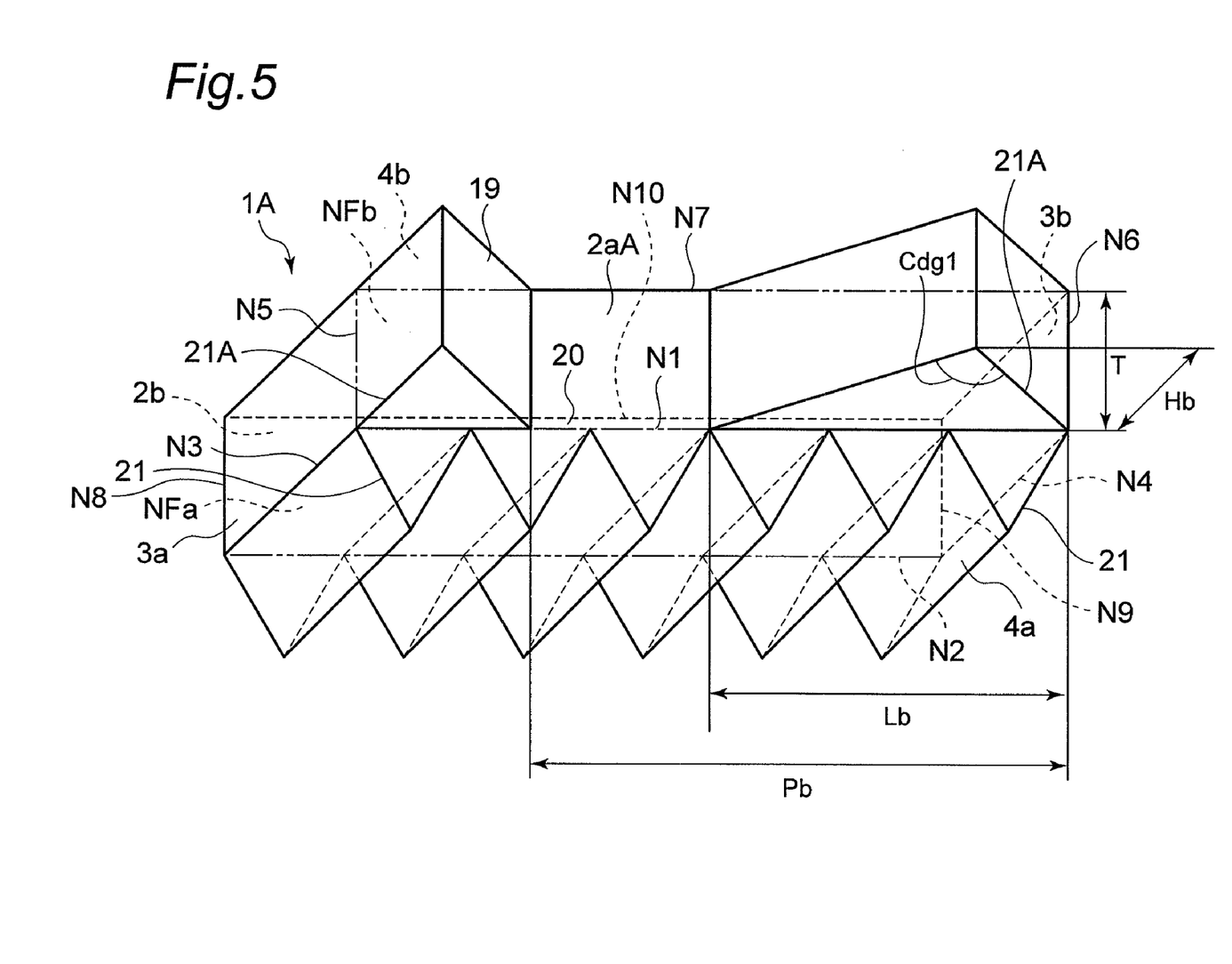
FIG. 5 is a perspective view of a light flux unifying region of a light guide plate in a second embodiment of the present invention.

FIG. 5 is a perspective view of a light flux unifying region 1A in a light guide plate of the second embodiment. An incident surface 2aA of the light flux unifying region 1A has inclined planes saw tooth-shaped and inclined in alternating one direction and the other direction. The incident surface 2aA is disposed in the vicinity of a virtual plane NFb. The virtual plane NFb is disposed perpendicular to the virtual plane NFa, the side 3a, side 3b and the surface 4b, respectively, across the boundary lines N1, N5, N6 and N7.

As shown in FIG. 5, a boundary line 21A between the incident surface 2aA and the virtual plane NFa forms a saw tooth shape in which a pitch Pb of the saw teeth is longer than a width Lb of the saw tooth. The incident surface 2aA forms a shape same as that of the boundary line 21A at a boundary line between the incident surface 2aA and an arbitrary cross section parallel with the virtual plane NFa. Specifically, the incident surface 2aA is shaped such that a portion corresponding to the width Lb of the saw tooth protrudes toward the row 11 of the LEDs from the virtual plane NFb in the form of a triangular prism. The incident surface 2aA has two kinds of rectangles, which are inclined in different directions from each other relative to the virtual plane NFb, in the protruding triangular prism.

At the incident surface 2aA, the plurality of light fluxes 5 emitted from the row 11 of the LEDs is dispersed and mixed by reflecting and refracting the light fluxes including components in the arrangement direction of the row 11 of the LEDs at the above-mentioned two kinds of inclined rectangles. By using the incident surface 2aA together with the light flux unifying surface 4a, the degree of unifying the light fluxes is further improved and the occurrence of firefly phenomenon is further suppressed. In the second embodiment, the width Lb of the saw tooth in the incident surface 2aA was set at 0.1 mm, the pitch Pb of the saw teeth was set at 0.15 mm, and a protrusion angle Cdg1 of the saw tooth was set at 120 degrees. In this case, the firefly phenomenon could not be visually recognized even when the distance Da (refer to FIG. 4) between the row 11 of the LEDs and the surface on the side of the liquid crystal display panel 16 of a light shielding section 13a was set at 4 mm.

In the incident surface 2aA, though the pitch Pb of the saw teeth was longer than the width Lb of the saw tooth, the pitch Pb of the saw teeth may be equal to the width Lb of the saw tooth.

(Third Embodiment)

In the third embodiment, points differing from the first and the second embodiments are principally described. Since other constitutions, actions and effects except these points are similar to those of the first and the second embodiments, descriptions thereof will not be repeated.

Figure 7:
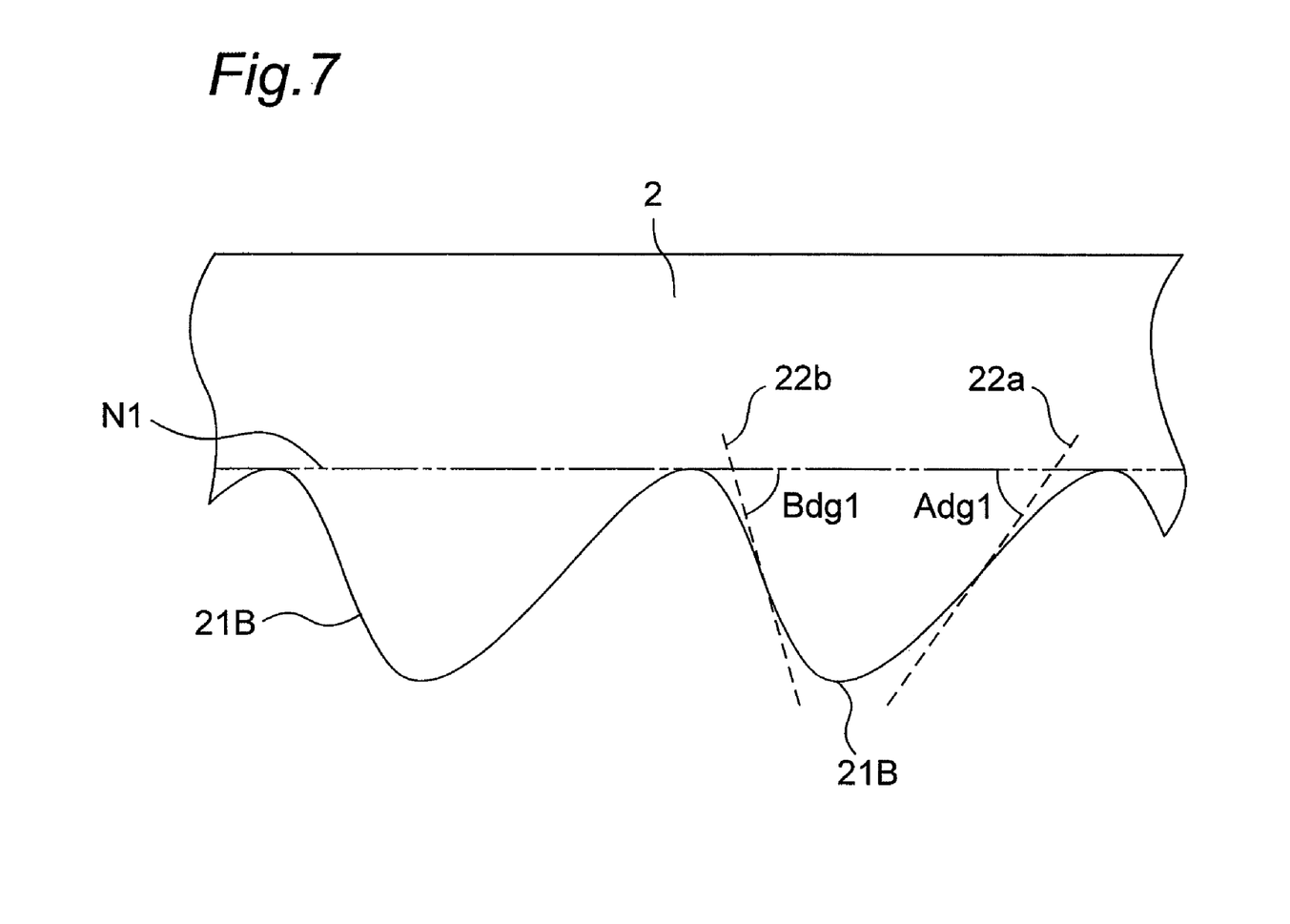
FIG. 7 is a schematic view showing a shape of a curve, having an inflection point, of a light flux unifying region of a light guide plate in a third embodiment of the present invention.

FIG. 7 is a schematic view showing a shape of a curve, having an inflection point, in a light guide plate of the third embodiment. In the light guide plate of the third embodiment, the light flux unifying surface 4a has a boundary line 21B in place of the boundary line 21. The boundary line 21B forms a shape in which a combination of two kinds of curved lines having an inflection point appears repeatedly. One kind of the curved lines has a tangent line 22a at the inflection point, and the other kind of the curved lines has a tangent line 22b at the inflection point. The tangent line 22a forms an angle Adg1 with the boundary line N1 and the tangent line 22b forms an angle Bdg1 with the boundary line N1. As with the saw tooth shown in FIG. 6, the light flux unifying surface 4a forms a shape same as that of the boundary line 21B at a boundary line between the light flux unifying surface 4a and an arbitrary cross section parallel with the incident surface 2a. That is, the light flux unifying surface 4a forms a shape in which a combination of the two kinds of curved faces appears repeatedly. A plane determined by a straight line parallel with the boundary lines N3 and N4 and the tangent line 22a is a tangent plane of one kind of the curved faces. A plane determined by a straight line parallel with the boundary lines N3 and N4 and the tangent line 22b is a tangent plane of the other kind of the curved faces. These two kinds of curved faces are inclined at the angles Adg1 and Bdg1, respectively, to the virtual plane NFa. The shape of the light flux unifying surface 4a at an arbitrary cross section parallel with the incident surface 2a may vary from the shape of the boundary line 21B while maintaining a similar shape as moving away from the incident surface 2a.

At the light flux unifying surface 4a, the plurality of light fluxes 5 having entered the incident surface 2a is dispersed and mixed by reflecting and refracting the light fluxes at these two kinds of inclined curved surfaces, and are unified into one light flux.

The incident surface 2aA in the second embodiment may have the boundary line 21B in place of the boundary line 21A.

All of the values described in the above embodiments are exemplified for specifically describing the present invention, and the present invention is not limited to these exemplified values. For example, higher brightness can be achieved by a constitution in which the arrangement pitch Sp of the row 11 of the LEDs is reduced. Further, by using the row 11 of the LEDs further downsized, the thickness T of the light guide plate 8 can be reduced. Accordingly, the length La of the light flux unifying region 1 can be further reduced and thus the effective display area S of the liquid crystal display panel 16 can be widened. Such various modifications can be made.

Though the LED was used as the light source in the above-mentioned embodiment, an effect of improving brightness can also be achieved even in the case of using a cold cathode ray tube which does not cause a firefly phenomenon.

Thus, the light guide plate 8 of the above-mentioned embodiments has the light flux unifying region 1 and the light deflecting region 7, and is shaped such that the whole light flux unifying surface 4a of the light flux unifying region 1 is inclined to the direction of arrangement of the row 11 of the LEDs. Thereby, in the light flux unifying region 1, the light fluxes are dispersed and mixed by the reflection and refraction of the light fluxes at the inclined surface and therefore the intensity distribution of the light fluxes is adequately unified. Thereafter, the unified light fluxes are deflected in the light deflecting region 7. Therefore, it becomes possible to adequately suppress the firefly phenomenon. Further, as a result of disappearance of the firefly phenomenon, it becomes possible to widen the effective display area S in the liquid crystal display panel 16. Furthermore, since the light flux unifying surface 4a is composed of the combination of the flat inclined surfaces, scattering of the light flux is low and the consumption of the light flux due to scattering loss becomes small. Therefore, the amount of the light fluxes, which contribute to the liquid crystal display panel 16, increases and the liquid crystal display panel 16 can achieve high brightness.

The light guide plate of the present invention can be widely applied to areas requiring a surface light source such as illuminations for key boards or switches which require uniform surface illumination since it can realize an illuminating device which is extremely low in unevenness of a light quantity and has high brightness.

The above descriptions in the embodiments are all specific examples of the embodiments of the present invention, and the present invention is not limited to these examples and can be developed to various examples which those skilled in the art can readily constitute using the techniques of the present invention.

This application claims priority based on Japanese patent application No. 2008-308631, filed on Dec. 3, 2008 and Japanese patent application No. 2009-256136, filed on Nov. 9, 2009 in Japan, and the contents thereof and the contents of Japanese patent application No. 2009-272212, filed on Nov. 30, 2009, are herein incorporated by reference.

The present invention can be applied to the light guide plates and display devices using the light guide plate.

What is claimed is:

1. A tabular light guide plate which receives incident light from a side, unifies the levels of the received incident light, and emits uniform light from a plane of the light guide plate, the light guide plate comprising:
an incident surface formed on one side of the tabular light guide plate for receiving the incident light;
a light emitting plane formed on one plane along an upper surface of the tabular light guide plate for emitting the uniform light;
a light deflecting region formed at a portion of the tabular light guide plate corresponding to the light emitting plane; and
a light flux unifying region formed at a portion of the tabular light guide plate between the incident surface and the light deflecting region,
wherein the light flux unifying region guides the incident light towards the light deflecting region, and
wherein the light flux unifying region has one plane thereof formed with a plurality of parallel grooves forming a zigzag surface, the plurality of parallel grooves (i) being formed along a lower surface of the tabular light guide plate and (ii) extending vertically from the incident surface.

2. The tabular light guide plate according to claim 1, wherein the plurality of parallel grooves form a saw tooth-shape when viewed onto the incident surface.

3. The tabular light guide plate according to claim 1, wherein the plurality of parallel grooves form a curved wave-shape when viewed onto the incident surface.

4. The tabular light guide plate according to claim 1, wherein the light flux unifying region includes light deflecting elements.

5. The tabular light guide plate according to claim 1, wherein the light deflecting region includes light deflecting elements.

6. The tabular light guide plate according to claim 1, wherein the light flux unifying region has a thickness greater than that of a portion of the tabular light guide plate where the light emitting plane exists.

7. The tabular light guide plate according to claim 1, wherein a pitch of the plurality of parallel grooves is 50 μm or smaller.

8. The tabular light guide plate according to claim 1, wherein a depth of the groove is between 1 μm and 20 μm.

9. A display device comprising:
a plurality of light sources arranged in a row;
a tabular light guide plate which receives incident light from a side, unifies the levels of the received incident light, and emits uniform light from a plane of the tabular light guide plate, the tabular light guide plate including
(1) an incident surface formed on one side of the tabular light guide plate for receiving the incident light,
(2) a light emitting plane formed on one plane along an upper surface of the tabular light guide plate for emitting the uniform light,
(3) a light deflecting region formed at a portion of the tabular light guide plate corresponding to the light emitting plane, and
(4) a light flux unifying region formed at a portion of the tabular light guide plate between the incident surface and the light deflecting region;
a prism sheet provided on the light emitting plane of the tabular light guide plate, for directing fluxes of light emitted from the light emitting plane to a direction approximately perpendicular to the light emitting plane; and
a reflecting plate provided on a plane opposite to the light emitting plane of the tabular light guide plate,
wherein the light flux unifying region guides the incident light towards the light deflecting region, and
wherein the light flux unifying region has one plane thereof formed with a plurality of parallel grooves forming a zigzag surface, the plurality of parallel grooves (i) being formed along a lower surface of the tabular light guide plate and (ii) extending vertically from the incident surface.

* * * * *